United States Patent [19]
Abramson

[11] 4,436,366
[45] Mar. 13, 1984

[54] END CAPPING AN OPTICAL FIBER

[75] Inventor: Edward A. Abramson, Newark, Del.

[73] Assignee: E. I. Du Pont de Nemours and Company, Wilmington, Del.

[21] Appl. No.: 235,036

[22] Filed: Feb. 17, 1981

[51] Int. Cl.³ .............................................. G02B 7/26
[52] U.S. Cl. ............................... 350/96.20; 350/96.30
[58] Field of Search ............... 350/96.20, 96.29, 96.30, 350/96.31, 96.32, 96.33, 96.34

[56] References Cited

U.S. PATENT DOCUMENTS

| | | | |
|---|---|---|---|
| 3,455,625 | 7/1969 | Brumley et al. | 350/96.22 |
| 3,864,019 | 2/1975 | Smolinsky et al. | 350/96.17 |
| 3,955,015 | 5/1976 | Ohtsuka et al. | 350/96.31 |
| 4,099,837 | 7/1978 | Vazirani | 350/96.29 |
| 4,290,667 | 9/1981 | Chown | 350/96.20 |

FOREIGN PATENT DOCUMENTS 2638110  2/1978  Fed. Rep. of Germany ... 350/96.20

OTHER PUBLICATIONS

Nomura et al., *Applied Optics*, vol. 14, No. 3, Mar. 1975, "Fiber Optic Sheets of Ridged Polymer Films", pp. 586–588.
International Fiber Optics and Communications, vol. 1, No. 5, Sep. 1980, "Epoxy Resin for Terminating PCS Fibers", p. 73.

*Primary Examiner*—John D. Lee
*Assistant Examiner*—Frank González

[57] ABSTRACT

Contacting a rough cut optical fiber end to a light-transmissible, hardenable material supported on a smooth substrate and thereafter hardening the material to form a smooth flat light transmissible surface at the end of the fiber.

5 Claims, 9 Drawing Figures

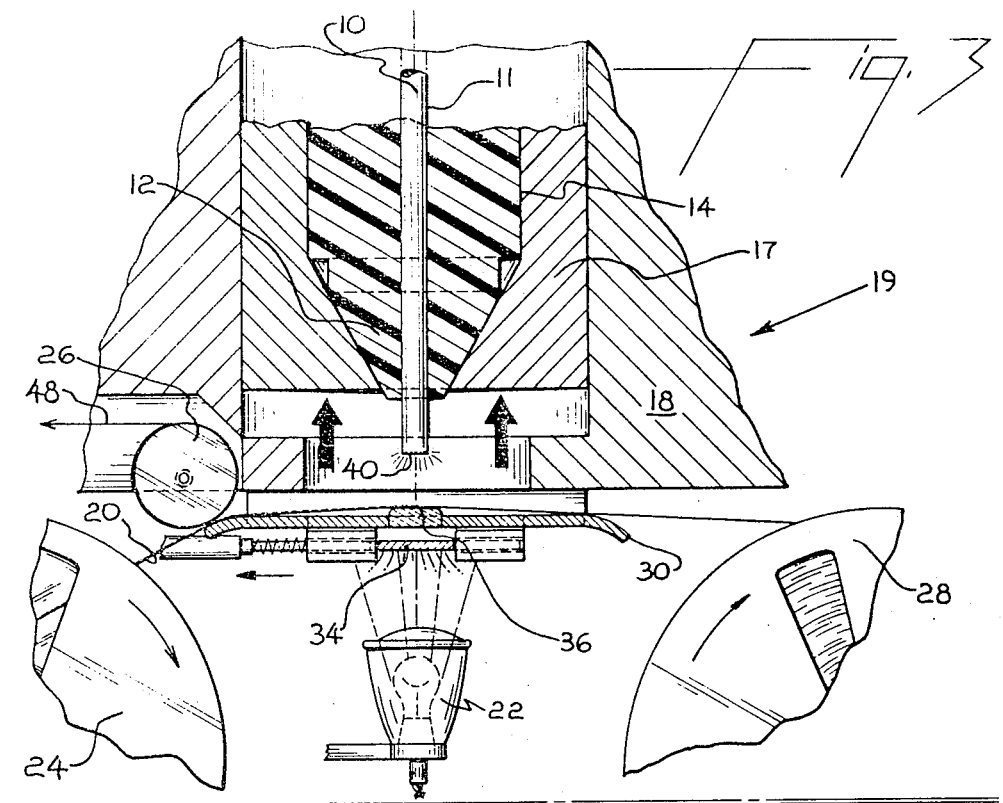
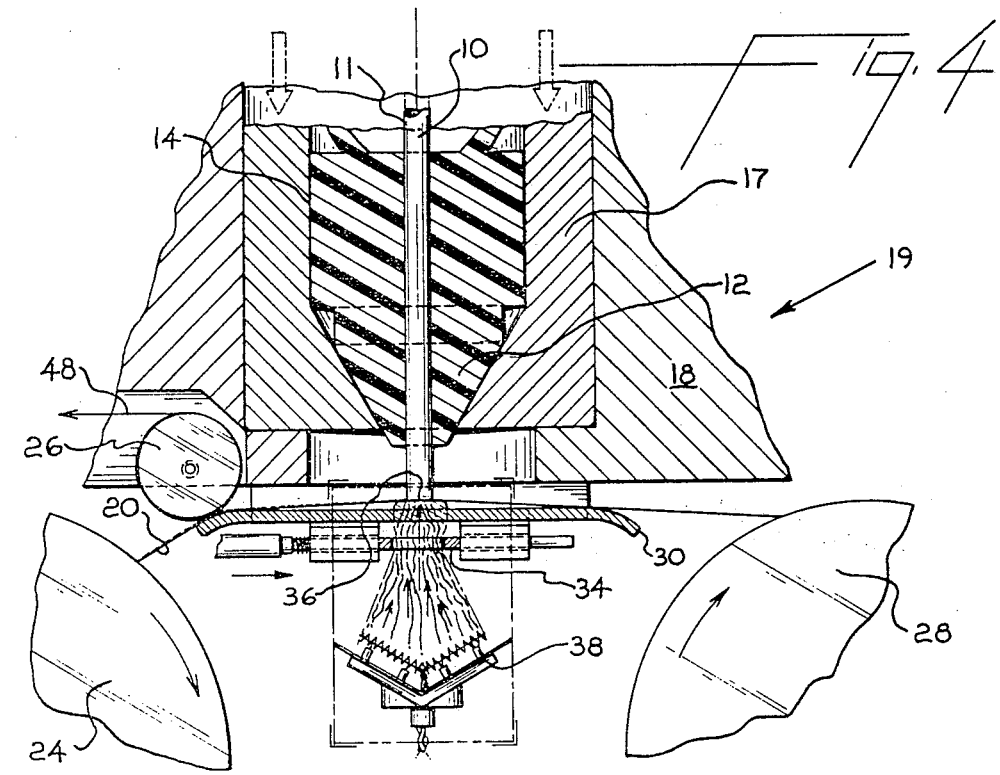

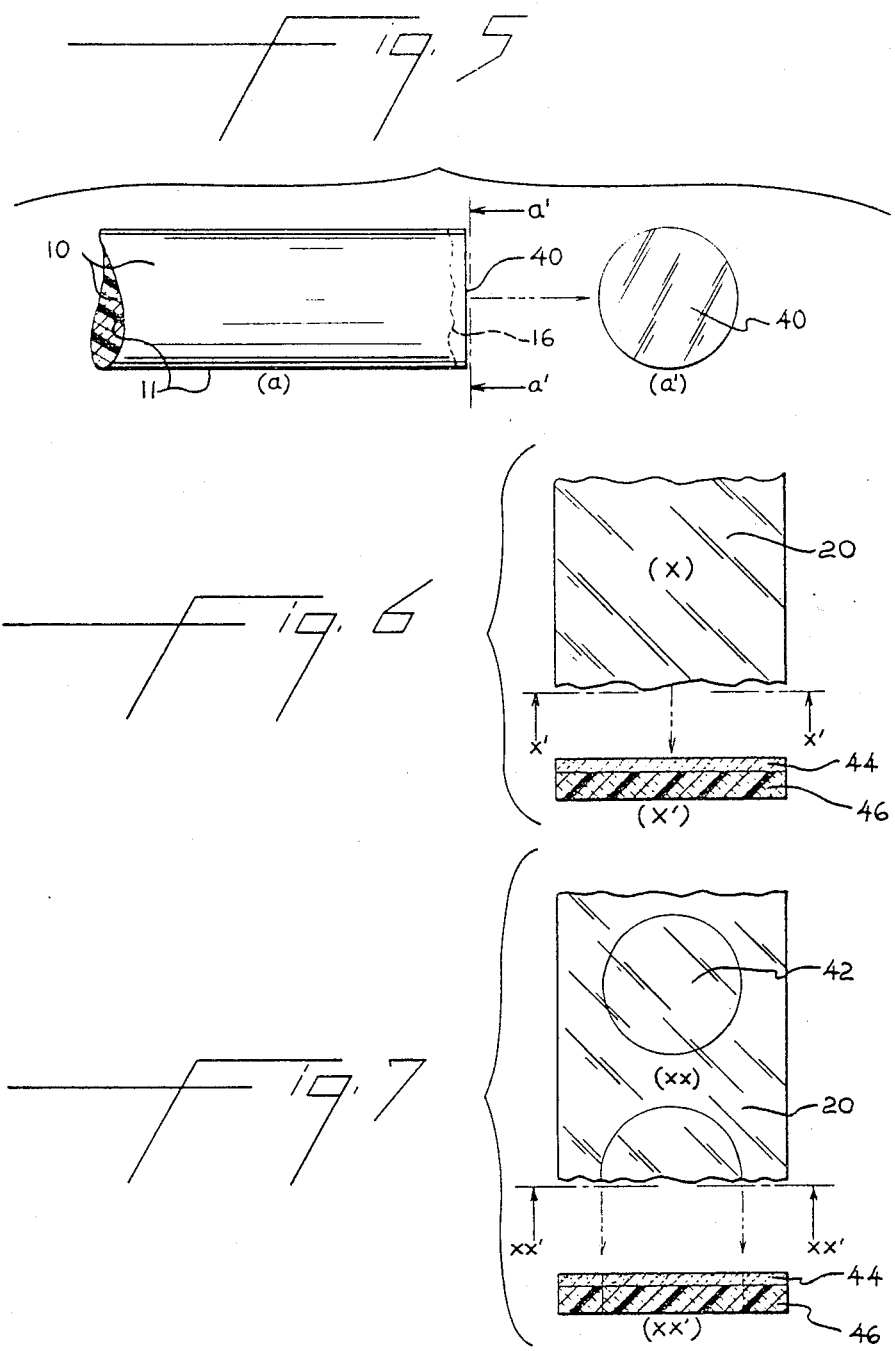

END CAPPING AN OPTICAL FIBER

FIELD OF THE INVENTION

This invention relates to a process for capping the end of an optical fiber with a hardenable material. More particularly, it refers to a process for immersing a rough cut end of an optical fiber in a thin, light-transmissible, hardenable material supported on a smooth film or other smooth substrate to form a smooth light transmissible flat surface at the end of the fiber.

BACKGROUND OF THE INVENTION

Optical fiber lengths of sufficiently good quality to produce low light loss in connectors can be made by abrasive polishing of the cut fiber end with successive finer grits. In practice, the abrasive medium is kept wet to provide lubricity and to assist the floating away of loose material. Successive polishing and inspection steps are employed until observation, usually with a microscope, shows that all scratches have disappeared. This method is time consuming and requires considerable operator skill. In addition, such a method is not easily adaptable to automatic machines. There is need, therefore, for a rapid method to generate an optically smooth end surface on an optical fiber which will minimize light losses when two such ends are brought into contact or preferably near-contact as in the case of a light conducting fiber optic connector.

It is desirable to have a procedure producing an end surface on a cut fiber which will contribute less than 1.0 db loss in the light transmitted through a connection between two similarly treated and accurately juxtaposed fibers. It is also highly desirable that such ends be produced either by unskilled labor or in automated equipment.

In an effort to resolve the problems presented by the grinding and polishing process, it has been proposed to utilize a fiber end coating material such as thermoplastic urethane which is cast onto the end of a fiber to produce a button-like cap. This button elastically deforms under pressure to provide good optical contact when used with a compression type connector. This method is described in U.S. Pat. No. 4,221,461. Unfortunately this procedure still does not solve all the problems since it involves on-the-spot application of a liquid substance to the fiber end and subsequent evaporation of a solvent before a cap is developed. In addition, since the final shape of the cap is not flat, compression is needed to maintain good optical qualities, necessitating a more complicated connector.

SUMMARY OF THE INVENTION

The present invention solves the above problems by providing a flat, optically clear, terminal surface or cap at the end of an optical fiber. The cap permits maximum light transmission without need for compression beyond that necessary to insure contact between the optical fiber end and a hardenable material.

Such a cap, providing low optical scattering loss, may be readily produced at the end of a cut optical fiber through a process comprising contacting a cut fiber end to a thin, light-transmissible, hardenable layer supported on a smooth film so as to embed said fiber in said hardenable layer, and then hardening the layer while the fiber remains embedded to form a smooth, flat surface at the end of the fiber.

BRIEF DESCRIPTION OF THE DRAWINGS

FIG. 3 is the same section as shown in FIGS. 1 and 2 after the fiber optic end is removed from the film strip.

FIG. 4 is the same section as shown in FIG. 2 with a heat source causing the hardening of the hardenable material.

FIG. 5($a$) shows a side view of the optical fiber with its end capped.

($a'$) shows the end view of the capped fiber.

FIG. 6($x$) shows a top view of the coated film and ($x'$) shows a cross section of the same film.

FIG. 7($xx$) shows an alternate embodiment of the invention where the film is punched out and ($xx'$) shows it in cross section.

Figure 8:
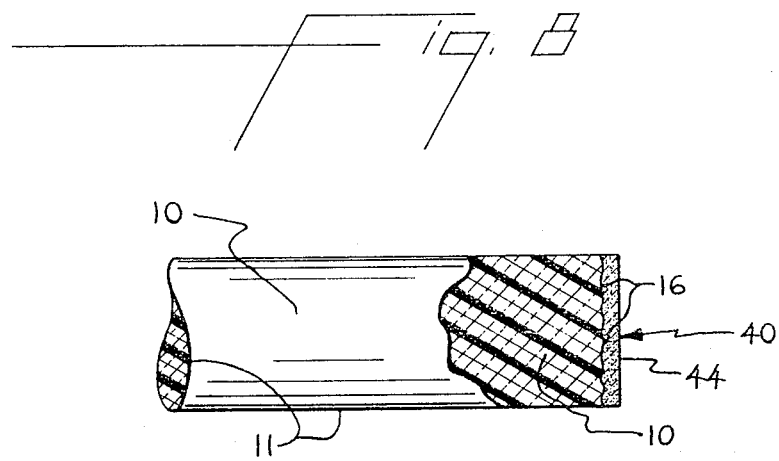

FIG. 8 shows a section of the optical fiber end of FIG. 5.

Figure 9:
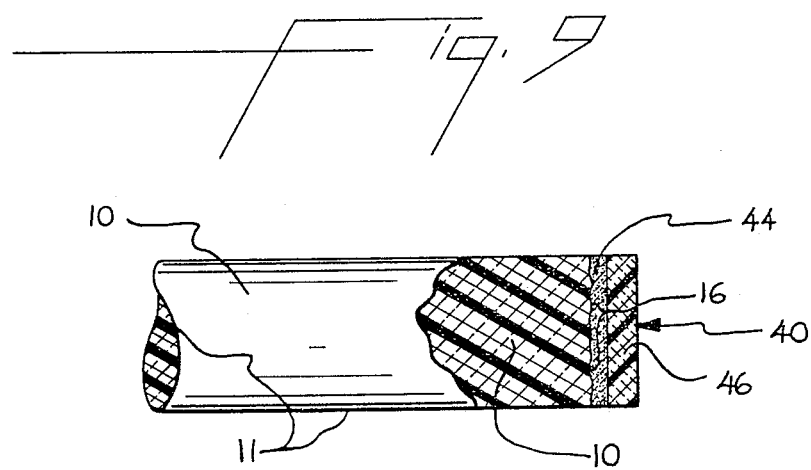

FIG. 9 shows a section of an optical fiber end such as produced from the punched out film of FIG. 7.

DETAILED DESCRIPTION

Figure 1:
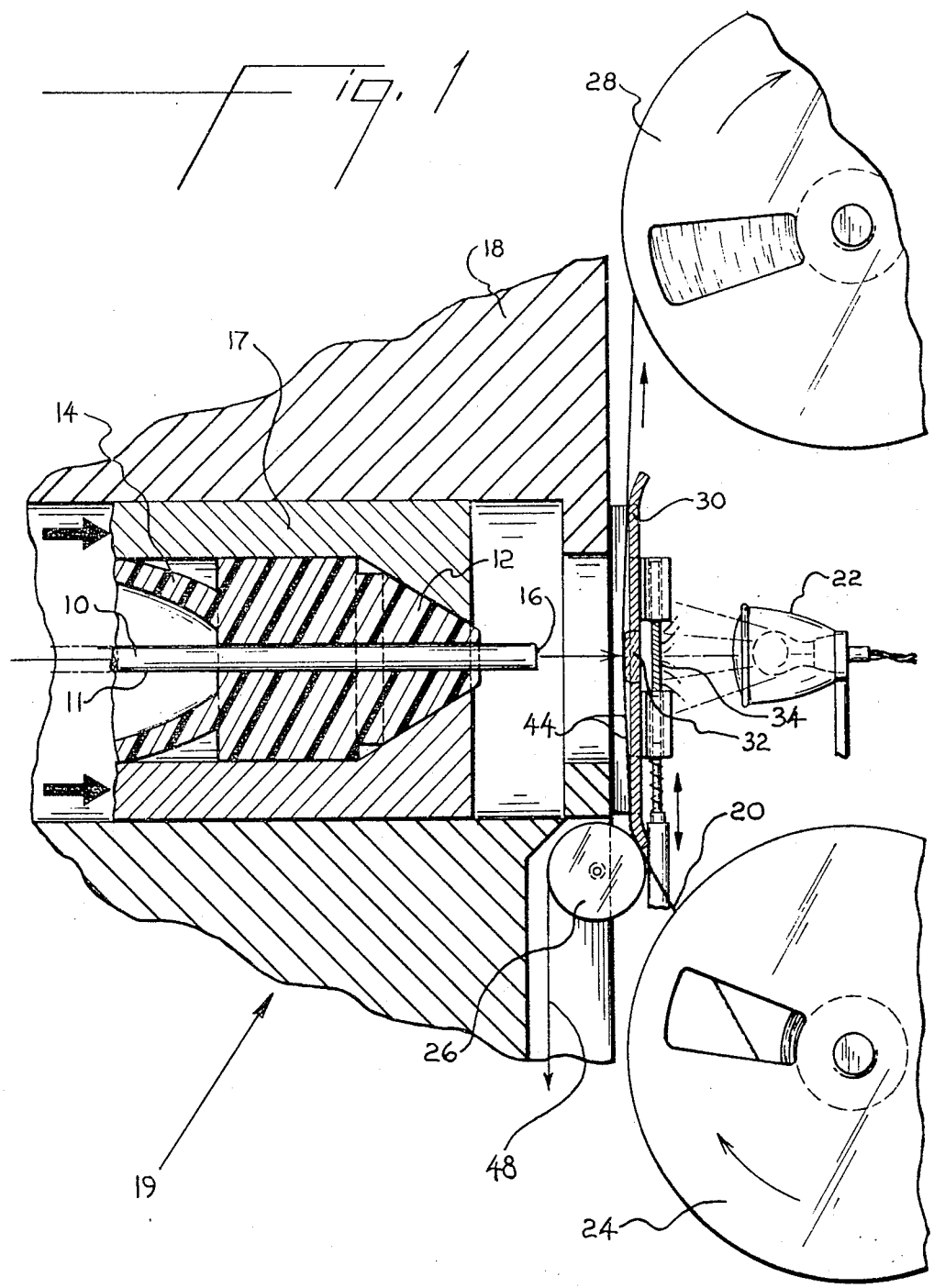
FIG. 1 is a section through an apparatus holding a cut fiber end in a fiber optic connector just before embedding the fiber end into a hardenable material supported on a film strip.

The desirable end capped optical fiber is attained by first coating a thin polyethylene terephthalate or similar transparent film 46 approximately 0.0234 mm thick with a hardenable material 44 as in FIG. 6, drying this coating, and covering it with a protective film layer 48 which allows the composite film 20 to be stored and transported in contact with itself. Film 20 containing the hardenable material 44 is pulled from a storage reel 24 through an energy transmissible hardening zone 32 on a film-support base 30. A roller 26 strips the protective film 48 before the film 20 reaches the hardening zone 32. An optical fiber 10 from a fiber optical cable is fed through an optical fiber connector 14 and gripped by the connector end 12. The optical fiber 10 with its cladding 11 surrounding its core is allowed to protrude approximately 1 mm from the end 12 of the connector 14. The optical fiber end 16 has been previously cut or equivalently fractured substantially perpendicular to its axis. The connector 14 is mounted within a housing 19 having a movable part 17 and a fixed part 18. It is guided by mechanical or electrical means towards the energy source 22 on the opposite side from the film support base 30. See FIG. 1.

Figure 2:
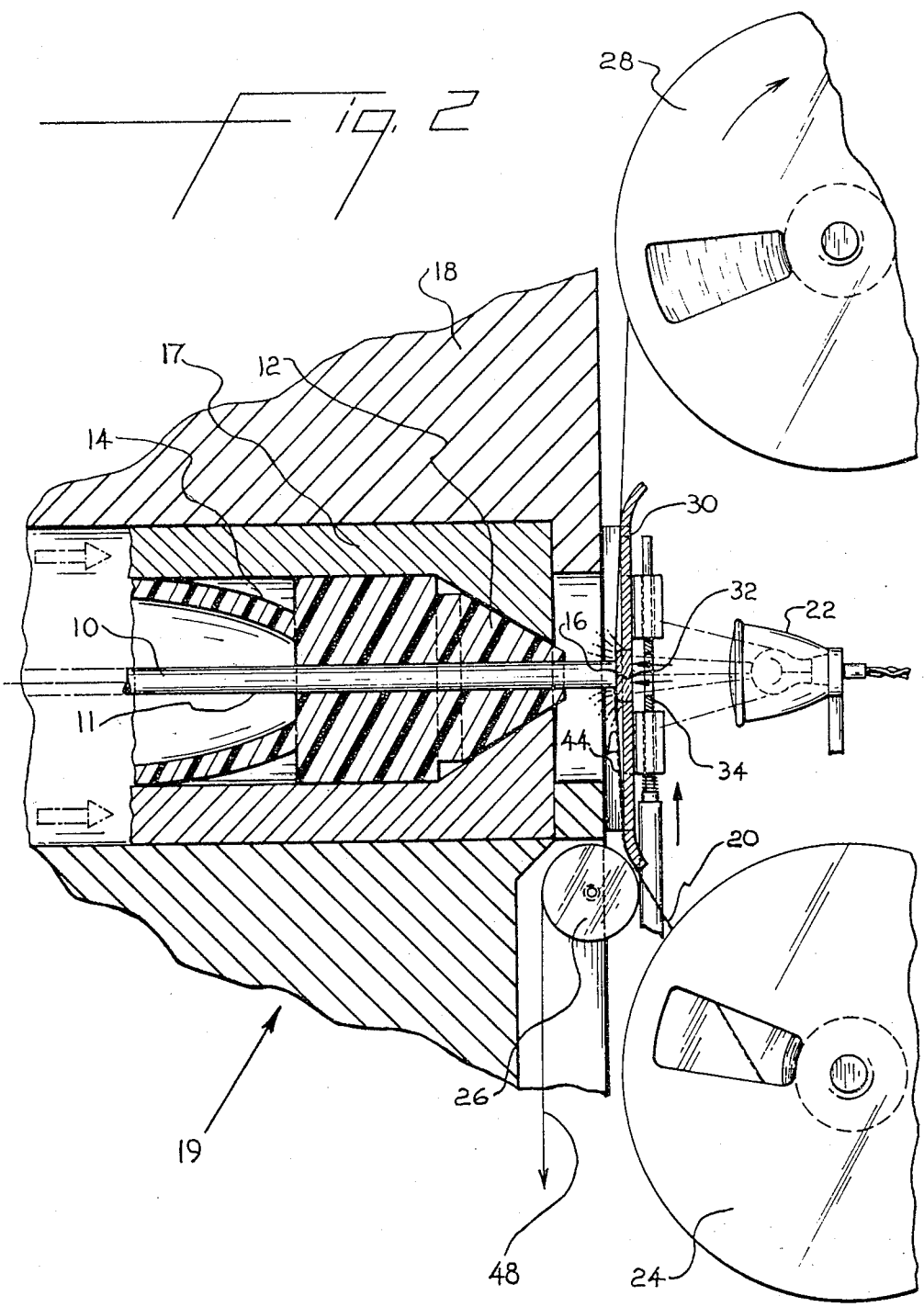
FIG. 2 is the same section as shown in FIG. 1 with the cut fiber end embedded in the hardenable material and a light source causing the hardenable material to harden.

In FIG. 2, the end 16 of the optical fiber contacts the film strip 20 containing a thin coating of a hardenable material 44. The rough cut end 16 of the optical fiber 10 is embedded within the hardenable layer on the surface of the film. The energy source such as light source 22 is caused to impinge upon the rough cut fiber end 16 now containing the hardenable material 44, either by controlled electrical activation or by action of shutter 34. The hardenable material thereafter hardens by virtue of exposure to the energy source.

The resulting smooth, flat, capped optical fiber end 40 containing the hardenable layer 44 in a hardened condition is shown in FIGS. 3, 5 and 8.

The hardenable layer 44 should be sufficiently thick to fill the surface depressions on the rough cut end 16 of the optical fiber, which depressions typically range in maximum depth from 2 μm to 20 μm. The hardenable layer, however, should not be so thick that the axial separation it introduces between two juxtaposed fiber ends increases the optical flux loss at this juncture by more than approximately 2 db. This maximum thickness of the hardenable layer depends on several parameters of the optical fiber to be end-capped, but most strongly on its core diameter and its numerical aperture (NA), which latter is defined as the sine of the angle at which the far-field angular distribution of light intensity exiting the fiber falls to 10% of its axial value. It has been found experimentally that a useful approximation for this maximum thickness is provided by the relationship Maximum Thickness $\approx 0.45 \times$ Core Diameter/NA. For plastic clad silica fiber with NA=0.38 and a core diameter of 200 μm, this maximum thickness is 240 μm.

The remaining film strip, after removal of the hardenable layer, continues onto reel 28. Another connector containing a rough cut optical fiber end can be inserted into the housing 19 and the process continued as the film strip 20 moves across the support 30.

The same process can be carried out substituting a heat source 38 for the light source 22 and hardenable materials sensitive to heat.

In an alternate embodiment the film strip 20 is punched out at the point of impact with the optical fiber end 16 so that the capped optical fiber end 40 has a coat of hardenable material 44 and the thin film 46. See FIGS. 7 and 9. The thin film 46 can be left on the fiber end or can be subsequently removed.

In the preferred embodiment of this process, the film 46 supporting the hardenable layer 44 is removed while the hardenable layer remains on said capped fiber end 40 as shown in FIG. 3.

The optical fiber employed in this invention can be any of the glass or plastic fibers employed in fiber optic communications, provided that the constituents of the hardenable layer do not dissolve or otherwise physically or chemically attack the elements of the fiber.

The thin film base can be any light transmissible film capable of supporting a hardenable material. The preferred films are polyethylene terephthalate and polyethylene.

The hardenable layer must be light transmissible in the same wavelength band used to transmit information through the optical fiber and preferably is a photohardenable composition. Among suitable photohardenable compositions are: (1) those in which a photopolymerizable monomer is present, preferably in combination with a compatible binder or (2) those in which a photopolymerizable group attached to a polymer backbone becomes activated through light source 22 and may then crosslink by acting with a similar group or other reactive sites on adjacent polymer chains. In the second group of suitable photopolymerizable systems, where the monomer or pendant photopolymerizable group is capable of addition polymerization, e.g., a vinyl monomer, the photopolymerized chain length may involve addition of many similar units initiated by a single photochemical event. Where only dimerization is involved, e.g., with benzophenone or cinnamoyl compounds, the average molecular weight of the photosensitive constituent can be, at best, only doubled by a single photochemical act. Where a photopolymerizable molecule has more than one reactive site, a crosslinked network can be produced.

If either a simple monomer or monomer-polymer composition has been used, the photosensitive layer preferably contains a free radical generating, addition polymerization initiator. Plasticizing agents as well as other known additives can be present in the photosensitive layer.

Suitable free radical initiated, chain propagating, addition polymerizable, ethylenically unsaturated compounds for use in the monomer or monomer-polymer binder photopolymerizable layers are described in U.S. Pat. Nos. 3,060,023, 3,261,686, 3,380,831 and 3,649,268. Polymers for use in the monomer-polymer system and preferred free radical generating addition polymerization in initiators are described in U.S. Pat. No. 3,060,023. These patents are herein incorporated by reference.

Photodimerizable materials useful in the invention are cinnamic acid esters of high molecular weight polyols, polymers having chalcone and benzophenone type groups, and others disclosed in Chapter 4 of "Light Sensitive Systems" by Jaromir Kosar, published by John Wiley and Sons, Inc., N.Y., 165. Photopolymerizable materials capable of crosslinking with more than one adjacent polymeric chain to form a network are described in U.S. Pat. Nos. 3,418,295 and 3,469,982. These patents are also herein incorporated by reference.

Preferred free radical generating addition polymerization initiators activatable by actinic radiation, e.g., ultraviolet invisible radiation are listed in U.S. Pat. No. 3,060,023 and the other patents referred to above.

Suitable plasticizers include: dialkyl phthalates, polyoxyethylene(4)monolaurylether, polyethylene glycol, triethylene glycol diacetate, alkyl phosphates, etc.

In addition to the photohardenable systems described above, the hardenable layer may be one which is thermally curable as shown in FIG. 4. Such thermally curable layers may include thermosetting layers such as clear epoxy resins which harden either at room temperature or upon exposure to elevated temperatures and in which such hardening is an irreversible setting process. Either one- or two-part epoxy resin systems may be employed, and when a two-part system is used, the components may be premixed and then applied as a layer, or two separate layers may be applied in a sequential application.

Thermally polymerizable layers may be used in which, rather than the free radical generating addition polymerization initiators activatable by actinic radiation referred to above, a thermally activatable initiator such as benzoyl peroxide may be used in which case hardening proceeds via polymerization of the monomers initiated by heating.

The end caps may also be produced using hardenable layers which exhibit thermoplastic properties. By thermoplastic properties I mean a layer which can be softened by heating to a temperature above room temperature and then hardened by recooling to room temperature. Such layers may be polymeric or nonpolymeric, such as paraffin, which can be softened by heating to 50° to 60° C. and hardened by recooling to room temperature.

The preferred hardenable materials are photopolymers described in U.S. Pat. No. 3,649,268 and in Example II below.

EXAMPLES

The following procedure is followed in all of the Examples. First, a thin layer of a hardenable composition is coated on a transparent supporting base such as a thin sheet of polyethylene terephthalate film base. After drying, the coating is optionally covered with a protective layer, such as a thin sheet of polyethylene, to facilitate temporary storage.

Secondly, a 50-meter length of a fiber optic cable having 200/μm silica core and a 600/μm hard plastic cladding, such as Pifax ® S-120, type 30, commercially available from E. I. du Pont de Nemours and Company, is connected between a light-emitting diode (LED) emitting at a wavelength of 820 nm and a silicon PIN diode located so as to detect all of the light exiting the fiber. The flux transmitted through this unbroken fiber is measured and recorded.

Thirdly, the fiber is then cut approximately two meters from the detecting PIN diode end. The cut ends are rough-ground perpendicular to the fiber axis using 40/μm abrasive particles. The ends are cleaned with an air blast to remove lingering ground particles or dust.

Fourthly, the protective layer, if employed, is removed from the coated hardenable layer and the fiber end is brought into contact with the coated hardenable layer and pressed therein. While the fiber end is thus embedded, the layer is hardened, as described in the specific examples below.

Following hardening, the now capped ends are abutted in perfect alignment. The reconnected 50 meters of optical fiber again transmit flux between the LED and silicon PIN detector diode. This transmitted flux is measured and the ratio of flux transmitted through the two connected fiber sections to that transmitted through the unbroken fiber is determined. This ratio is then converted to decibels (db) by taking the negative of 10 times its logarithm and the resulting number used to indicate the power loss in the various end-capping methods. In all examples, the final values have been corrected for long term drift of the testing apparatus. In addition, the accuracy of the reported results is estimated to be within ±0.4 of the reported db value.

The following materials and compositions, together with the described specific steps, demonstrate a wide variety of methods implementing the process of this invention.

EXAMPLE 1

There is first selected a 0.0008 inch (0.020 mm) thick strip of positive working Cromalin ® 4/C proofing film, commercially available from E. I. du Pont de Nemours and Company and which comprises a polyethylene terephthalate film base coated with a photohardenable, photopolymerizable layer. A fiber, its end cut and prepared as disclosed above, is then embedded into the photohardenable layer and exposed to UV radiation through the film base using a mercury short-arc lamp as source. The hardenable composition hardens in the area exposed to the UV radiation in the absence of a continuing supply of oxygen. The only such area is the area in contact with the fiber end. The fiber end serves as a seal preventing atmospheric oxygen from reaching the photohardenable layer from one side, and the supporting base prevents oxygen from reaching the photohardenable layer from the other side.

Following hardening of the photopolymerizable layer, the transmission loss with the film base still attached to the end of the fiber is measured as disclosed above and is found to be 0.9 db.

EXAMPLE 2

| A photopolymerizable composition comprising: | |
|---|---|
| trimethylol propane triacrylate | 120 g |
| polyoxyethyl trimethylolpropane triacrylate (Average Mol. Wt. 1000) | 26 |
| polyethyleneoxide lauryl ether (M.W. 362) | 26 |
| 2-mercapto benzoxazole | 2.4 |
| styrene/maleic anhydride copolymer (1:1) partially esterified with isopropanol acid No. 270. M.W. 1700 | 150 |
| 2,2'-(o-chlorophenyl)-4,4',5,5'-tetraphenylbiimidazole | 60 |
| Michler's ketone | 3.6 | dissolved in 720 ml of methylene chloride, is coated on a polyethylene terephthalate transparent film base 0.00092 inches (0.0234 mm) thick.

Using the same procedure as for Example 1 except that the UV radiation is obtained from a xenon flash tube, a loss of 2.4 db is measured. Following this measurement, the polyethylene terephthalate film is removed from the fiber end leaving adhered onto the fiber end the photopolymerized, hardened layer. Loss measurements are repeated and the loss is found to be 1.6 db.

EXAMPLE 3

A photocrosslinkable hardenable layer is used such as KPR photoresist available commercially from the Eastman Kodak Company, in which hardening proceeds through the exposure to UV radiation and the subsequent crosslinking of polyvinyl alcohol/polyvinyl cinnamate copolymer chains. This layer supported on a polyethylene base 0.001 inch (0.025 mm) thick, is used as in Example 1 above to provide a cap at the end of a fiber optic cable. Measurements indicate a 1.8 db loss with the film base attached to the end of the fiber and 1.3 db loss with the film base removed.

EXAMPLE 4

A thermosetting layer is coated on a thin film sheet of polyethylene 0.0254 mm thick. The thermosetting layer comprises a commercially available two-part epoxy resin and hardener adhesive available through Tra-Con, Inc. of Medford, Mass. under the trade name Tra-Bond 2101, having a specific gravity of 1.20 and a viscosity after mixing of 190 poise at 25° C. It is mixed in proportions by weight of 25 parts of hardener to 100 parts of resin. The fiber optic end is embedded in the hardenable layer and the layer allowed to set for a period of 18 hours at 20°-25° C. Transmission loss is again measured as described above in Example 2, first with the polyethylene base left on the fiber, and then with the base removed and the set adhesive layer alone forming a cap to the fiber. In both instances, loss is measured as 1.0 db.

EXAMPLE 5

A thermally polymerizable layer is used as a hardenable layer which comprises the composition shown in Example 2 above, but in which the 2,2'-(o-chlorophenyl)-4,4',5,5'-tetraphenyl-biimidazole and Michler's ketone are replaced by 6.5 g of a thermally sensitive initiator, benzoyl peroxide. The resulting composition is coated on polyethylene terephthalate base 0.00092 inch (0.0234 mm) thick, and the fiber end is embedded therein. Following exposure to heat at 70° C. for 60 min., whereby polymerization hardens the layer, transmission loss is measured as 1.7 db both with and without the film base present.

EXAMPLE 6

A coating composition providing a thermoplastic layer comprising a mixture of an ethylene/vinyl acetate copolymer, Elvax ® 210, available commercially through E. I. du Pont de Nemours and Company and a tackifying resin, Escorez ® 5280, an aliphatic hydrocarbon tackifying resin made by Exxon Corp., in a 35/65 ratio by weight is coated on a 0.001 inch (0.0254 mm) polyethylene base. This composition is hard at normal room temperatures but may be softened by heating to 80°-120° C. The layer is softened by heating to 80° C., a temperature low enough to not affect either glass fiber or the protective cladding, and while soft, the glass fiber end is embedded therein. It is then cooled to room temperature (20° C.), whereupon the thermoplastic layer becomes hard. As in Example 1 above, transmission loss is measured with the polyethylene film present as part of the end cap and recorded as 1.8 db.

The same composition is then coated onto a sheet of polyethylene terephthalate base, 0.00092 inches (0.0234 mm) and the procedure is repeated. Loss is measured as 1.6 db. The film base is removed by peeling it off from the fiber end, leaving behind the hardened layer. The light loss is measured as 1.1 db.

EXAMPLE 7

A nonpolymeric hardenable layer, paraffin, which can be softened by heating to a temperature of about 50° to 60° C. and which is hard at room temperature is coated on a polyethylene terephthalate base as in Example 6. Following the same procedure as in Example 6, but heating it only to about 60° C., loss measurements are recorded as 0.8 db with the film base as part of the end cap and 0.6 db with the film base removed.

I claim:

1. A cut optical fiber end capped with a light transmissible smooth flat surface comprising a hardened photopolymerizable layer having a maximum thickness about 0.45 times the diameter of the core divided by the numerical aperture of said core and a minimum thickness of 20 μm.

2. An end capped optical fiber according to claim 1 wherein the photopolymerizable layer is derived from a composition comprising trimethylol propane triacrylate, polyoxyethyl trimethylolpropane, polyethyleneoxide lauryl ether, 2-mercapto benzoxazole, styrene/maleic anhydride copolymer, 2,-2'-(o-chlorophenyl)-4,4',5,5'-tetraphenylbiimidazole and Michler's ketone.

3. A cut optical fiber end capped with a light transmissible smooth flat surface comprising a hardened thermally polymerizable layer having a maximum thickness about 0.45 times the diameter of the core divided by the numerical aperture of said core and a minimum thickness of 20 μm.

4. An end capped optical fiber according to claim 3 wherein the thermally polymerizable layer is derived from a composition comprising trimethylol propane triacrylate, polyoxyethyl trimethylolpropane, polyethyleneoxide lauryl ether, 2-mercapto benzoxazole, styrene/maleic anhydride copolymer and benzoyl peroxide.

5. A cut optical fiber end capped with a light transmissible smooth flat surface comprising a hardened photocrosslinkable layer having a maximum thickness about 0.45 times the diameter of the core divided by the numerical aperture of said core and a minimum thickness of 20 μm.

* * * * *